United States Patent
Gonze et al.

(10) Patent No.: US 10,981,644 B2
(45) Date of Patent: Apr. 20, 2021

(54) ASSEMBLY FOR AIRCRAFT COMPRISING A MOVEABLE BEARING SURFACE SUPPORTED BY A DRIVE SHAFT PASSING THROUGH A SLIT PROVIDED WITH A SEAL WITH IMPROVED SEALING EFFICIENCY

(71) Applicant: SONACA S.A., Gosselies (BE)

(72) Inventors: Albert-Paul Gonze, Nalinnes (BE); Laurent Ravier, Taisnieres-sur-Hon (FR)

(73) Assignee: SONACA S.A., Gosselies (BE)

(*) Notice: Subject to any disclaimer, the term of this patent is extended or adjusted under 35 U.S.C. 154(b) by 52 days.

(21) Appl. No.: 16/272,171

(22) Filed: Feb. 11, 2019

(65) Prior Publication Data
US 2019/0248470 A1    Aug. 15, 2019

(30) Foreign Application Priority Data
Feb. 13, 2018   (BE) .................................. 2018/5088

(51) Int. Cl.
| | |
|---|---|
| *F16J 15/46* | (2006.01) |
| *F16J 15/3232* | (2016.01) |
| *F16J 15/02* | (2006.01) |
| *B64C 9/16* | (2006.01) |
| *B64C 9/02* | (2006.01) |
| *B64C 7/00* | (2006.01) |

(52) U.S. Cl.
CPC .................. *B64C 9/16* (2013.01); *B64C 7/00* (2013.01); *B64C 9/02* (2013.01); *F16J 15/025* (2013.01); *F16J 15/3232* (2013.01); *F16J 15/46* (2013.01)

(58) Field of Classification Search
CPC .......... F16J 15/025; F16J 15/00; F16J 15/022; F16J 15/02; F16J 15/46; F16J 15/48; F16J 15/32; F16J 15/322; F16J 15/3232; F16J 15/3234; F16J 15/104; B64C 9/16; B64C 9/00; B64C 9/02; B64C 9/18; B64C 9/20; B64C 9/22; B64C 9/24; B64C 9/26; B64C 9/28; B64C 7/00
USPC ....................................................... 277/345
See application file for complete search history.

(56) References Cited

U.S. PATENT DOCUMENTS

| | | | | |
|---|---|---|---|---|
| 2,394,732 | A * | 2/1946 | Williams ............... | A44B 11/26 24/385 |
| 3,480,237 | A * | 11/1969 | Appleby .................. | B64C 3/40 244/46 |
| 3,892,016 | A * | 7/1975 | Brown .................... | A44B 19/32 24/389 |
| 4,027,361 | A * | 6/1977 | Yoneya .................. | A44B 19/26 24/385 |
| 4,979,702 | A * | 12/1990 | Franklin ................ | A44B 19/26 24/385 |

(Continued)

FOREIGN PATENT DOCUMENTS

EP    2942550 A1    11/2015

OTHER PUBLICATIONS

Preliminary Belgium Search Report for Belgium Application No. 2018/5088 dated Oct. 24, 2018.

*Primary Examiner* — Nathan Cumar
(74) *Attorney, Agent, or Firm* — Pearne & Gordon LLP

(57) ABSTRACT

An assembly for an aircraft including an aircraft wall in which a routing slit is formed. A drive shaft of a bearing surface passes through the slit while remaining free to move along the slit. A seal is provided to seal the slit.

10 Claims, 4 Drawing Sheets

(56) References Cited

U.S. PATENT DOCUMENTS

2017/0183073 A1\* 6/2017 Simonis .................... B64B 1/30
2017/0327204 A1\* 11/2017 de Sousa ............... F16J 15/104

\* cited by examiner

ASSEMBLY FOR AIRCRAFT COMPRISING A MOVEABLE BEARING SURFACE SUPPORTED BY A DRIVE SHAFT PASSING THROUGH A SLIT PROVIDED WITH A SEAL WITH IMPROVED SEALING EFFICIENCY

TECHNICAL DOMAIN

The domain of this invention is the junction between an aircraft wall and a moveable bearing surface, and more specifically a fuselage wall and a moveable trailing edge flap.

The invention relates to all types of moveable trailing edge flaps, for example "single slot", "double slot", "fixed vane" flaps, etc.

It is noted that the invention is applicable to all types of aircraft such as a sailwing, an aircraft with engine at the tail of the fuselage, a subsonic aircraft, a supersonic aircraft, etc.

STATE OF PRIOR ART

The inboard moveable trailing edge flap on aircraft wings, in other words the flap adjacent to the fuselage, is provided with a drive shaft that passes through a slit in this fuselage. This drive shaft is controlled from inside the fuselage by conventional drive means.

The passage of the drive shaft through the slit in the fuselage creates an aerodynamic problem because external air could be disturbed by the presence of this slit. It is known that disturbances to the air flow can be limited by implanting a seal system in the slit in the fuselage. More precisely, two distinct seal parts are provided between which the drive shaft is free to move, during displacement of the moveable flap between its retracted position and its extended position.

It is usually a seal acting uniformly over its entire length at the passage of the drive shaft, comprising two lips facing each other and deforming in an overall movement.

In practice, one of the difficulties associated with this solution lies in determination of the stiffness of the lips of the sealing system. A high stiffness causes a large deformation of the lips due to the passage of the shaft, this deformation propagating along a significant length of these lips. This results in the presence of a parasite opening with a large section on each side of the shaft, that causes significant aerodynamic disturbances at the slit in the fuselage. Conversely, low stiffness of the sealing lips reduces their deformation at the shaft passage, but leads to the appearance of an uncontrolled deformation.

The purpose of the invention is to disclose a seal structure that improves the sealing efficiency of a slit through which a drive shaft passes.

PRESENTATION OF THE INVENTION

To achieve this, the purpose of this invention is an assembly for aircraft including:
 a wall delimiting the interior from the exterior of the aircraft, such as part of the fuselage or wing, this wall being provided with a through shaped routing slit extending along the length direction of the slit from a forward end of the slit to an aft end of the slit;
 a drive shaft that supports a bearing surface, this shaft passing through the slit and being free to move along the length direction of the slit between the forward and aft ends of the slit;
 a lower mounting and an upper mounting fixed to the wall and arranged on each side of the slit along a width direction of the slit that is normal to the length direction of the slit;
 a seal to seal the slit, comprising a seal lower part and a seal upper part arranged facing each other on each side of the slit and supported by the lower mounting and the upper mounting respectively, these seal lower and upper parts comprising flexible lower and upper lips respectively compressible in the direction of the width, these lower and upper lips forming contact tracks between which the drive shaft is squeezed and moves deforming the seals when the bearing surface is moved;
 characterised in that the seal lower part comprises a lower stiffener supporting the lower lip, the seal upper part comprises an upper stiffener supporting the upper lip, each of the lower and upper lips being in the form of rabbit ears, with either the lower lip or the upper lip comprising two independent outgrowths, and the other among the lower lip and the upper lip comprising two outgrowths connected to each other by a flexible and compressible balloon that will be housed between the two independent outgrowths.

With this solution, deformation of the seal lower and upper parts is limited to a local zone, conferring a winding effect around the shaft.

The invention also relates to a method thus defined in which each of the lower and upper lips comprises a rigid base starting from which the outgrowths project.

The invention also relates to a method thus defined in which:
 the lower stiffener is supported by lower stands at a spacing from each other along the length direction of the slit and bearing on the lower mounting;
 the upper stiffener is supported by upper stands at a spacing from each other along the length direction of the slit and bearing on the upper mounting;
 these lower and upper stands being designed to press the lower and upper lips into contact with each other, while remaining compressible along the width direction of the slit.

The invention also relates to a method thus defined in which the lower and upper stands are formed from a sequence of accordion shaped elastic portions along the width direction of the slit.

The invention also relates to a method thus defined in which:
 the lower stiffener is formed from an alternation of lower rigid cells and lower flexible portions;
 the upper stiffener is formed from an alternation of upper rigid cells and upper flexible portions.

The invention also relates to a method thus defined in which:
 each of the lower rigid cells is arranged along the prolongation of a lower stand along the width direction of the slit;
 each of the upper rigid cells is arranged along the prolongation of an upper stand along the width direction of the slit;

The invention also relates to a method thus defined, in which the length direction of the slit is circular, in which the seal lower part has a convex shape as viewed from the slit, and in a complementary manner the seal upper part has a concave shape as viewed from the slit, the lower and upper mountings extending perpendicular to the fuselage wall 5a and each intersecting it so that each forms a line corresponding to an offset from the length direction of the slit, along the width direction of the slit.

The invention also relates to a method thus defined, in which the outgrowths connected by the balloon are supported by the upper lip.

The invention also relates to a method thus defined, in which the lower mounting is prolonged by lower side walls that at least partly surround the seal lower part, and/or the upper mounting is prolonged by upper side walls that at least partly surround the seal upper part, these lower and upper side walls forming stop surfaces for the seal lower and upper parts extending along the width direction of the slit.

The invention also relates to a method thus defined in which the supporting surface is a moveable trailing edge flap.

DETAILED PRESENTATION OF PARTICULAR EMBODIMENTS

Figure 1:
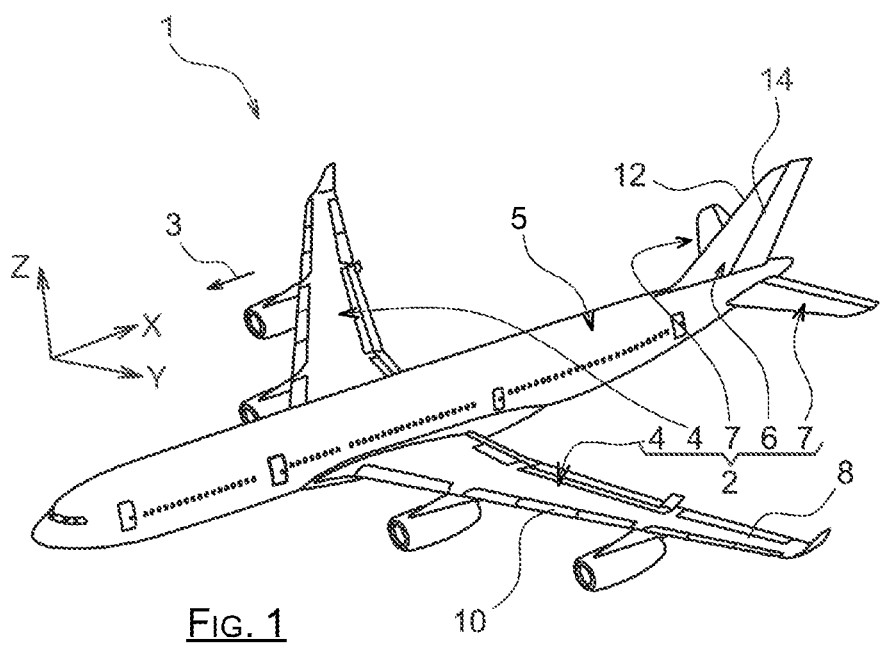
FIG. 1 represents a perspective view of an aircraft.

With reference first to FIG. 1, the figure shows an aircraft 1 with a wing 2 composed of a plurality of wing elements, also called aerodynamic lift surfaces.

Throughout the following description, the terms "forward" and "aft" should be considered relative to the advance direction of the aircraft that takes place as a result of the thrust applied by the aircraft engines, this direction being represented diagrammatically by the arrow 3.

The wing elements of the aircraft 1 include two principal wings called wings 4, a vertical stabiliser 6, and two horizontal stabilisers 7 located at the aft end of this aircraft. These elements are fixed to the fuselage 5 of the aircraft.

Each of the wings 4, as mentioned above, comprises a central fixed wing body 8, also called the principal central portion, this body forming practically the entire wing, and being located behind a leading edge 10. Throughout the description given below, by convention Y corresponds to the longitudinal direction of the leading edge or the wing length direction, X corresponds to the direction oriented transverse to the leading edge 10, and the Z direction corresponds to the vertical direction, these three directions being orthogonal to each other.

Figure 2:
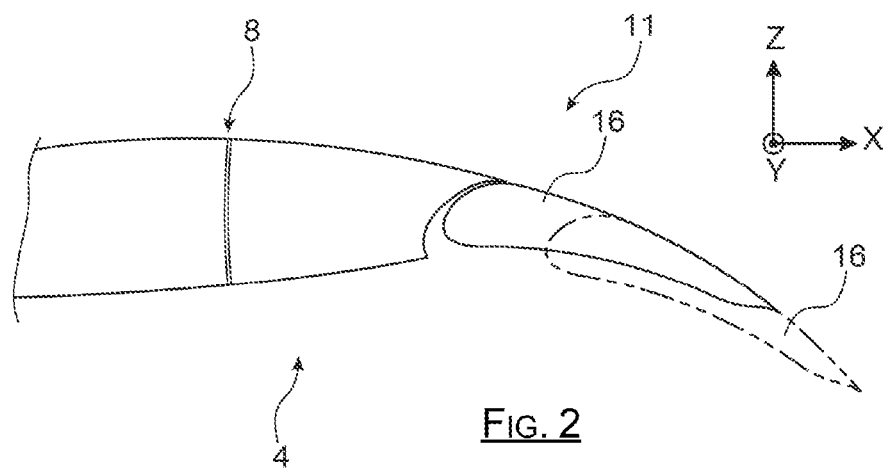
FIG. 2 represents a partial diagrammatic sectional view of an aircraft wing according to this invention, provided with a moveable trailing edge flap.

As shown diagrammatically on FIG. 2, the trailing edge 11 of each of the two wings 4, opposite the leading edge, may be fitted with at least one moveable trailing edge flap 16. They may be any type of moveable trailing edge flaps, for example "single slot", "double slot", "fixed vane" flap, etc.

Each of these flaps 16 will be connected to the body 8 by conventional means. This FIG. 2 shows that the moveable trailing edge flap 16 (represented diagrammatically) can be in a retracted position in which it is flush with the aft part of the fixed central body 8 of the wing 4. In such a case, the moveable flap 16 is in its furthest forward position. Furthermore, the moveable flap 16 can be in a fully extended position in which it is at a distance towards the aft side of the central fixed body 8, this fully extended position being used particularly during landing and takeoff phases so as to increase the lift at low or medium speed. Obviously, this flap 16 is designed to be moved between these two extreme positions, for example so that it can adopt an intermediate takeoff position known to an expert in the subject.

For information, the mobile flap 16 extends for example over the entire length of the wing 4 concerned, obviously along the length direction of this wing 4, or only over a portion of this wing, as is usually the case on aircraft.

Figure 2A:
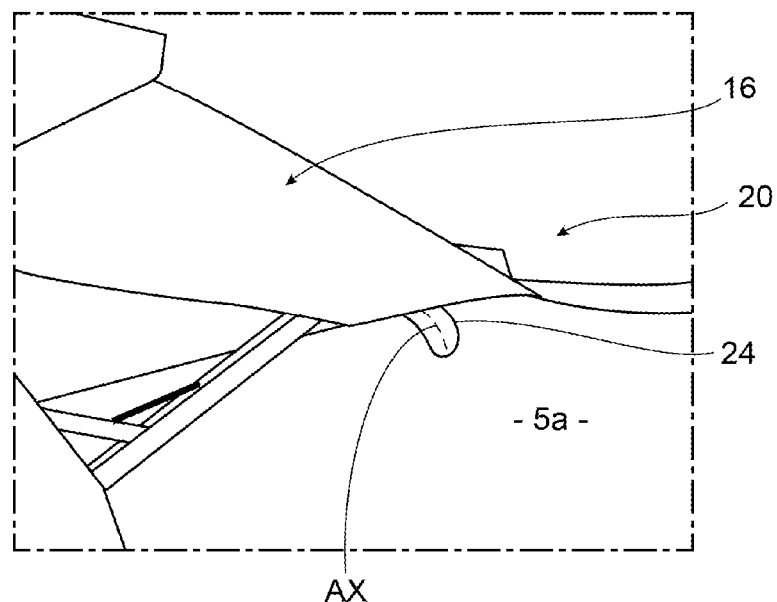
FIG. 2a represents a perspective view of an assembly for an aircraft according to the invention, comprising a fuselage part and a moveable trailing edge flap adjacent to this fuselage part.
Figure 2B:
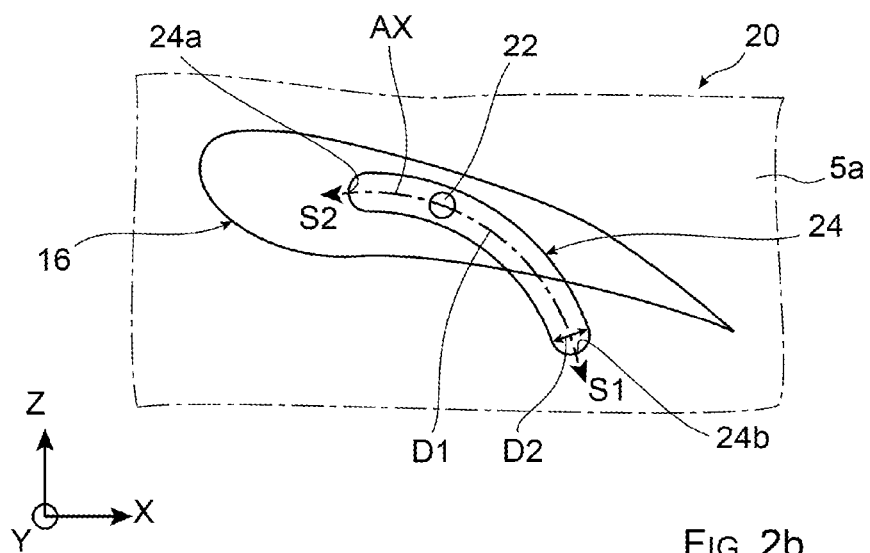
FIG. 2b is a diagrammatic side view of the assembly shown on the previous figure.

More precisely, the invention relates to the moveable trailing edge flap 16 that is the furthest inboard, namely the flap adjacent to the fuselage 5 delimiting an exterior EXT from an interior INT of the aircraft. A fuselage wall 5a and this flap 16 belong to an assembly 20 according to the invention, this assembly represented partially on FIGS. 2a and 2b.

The inner end of the flap 16 along the wing length direction Y, is fixed to a drive shaft 22 that is controlled by appropriate means housed inside the fuselage. To achieve this, the shaft 22 extends along the wing length direction Y passing through a routing slit 24 that is a hollowed out volume in the fuselage wall 5a and with median line AX extending along a slit length direction D1 that is circular.

This slit 24 that passes through the fuselage wall 5a follows the trajectory of the flap 16 when it moves from its retracted position to its extended position. In this respect, it should be noted that the assembly 20 is configured such that when the flap 16 moves from its retracted position to its extended position, the shaft 22 is displaced in the slit 24 along a first length direction S1 of the slit D1. This first direction S1 is oriented to pass from a forward end 24a of the routing slit corresponding to the retracted position of the flap, to an aft end 24b of the flap corresponding to the extended position of the flap.

Similarly, when the flap 16 moves from the extended position to the retracted position, the shaft 22 moves in the slit along a second direction S2 opposite to the first direction S1.

The assembly 20 according to the invention also comprises a linear seal 30 at the slit 24 to seal it.

Figure 3:
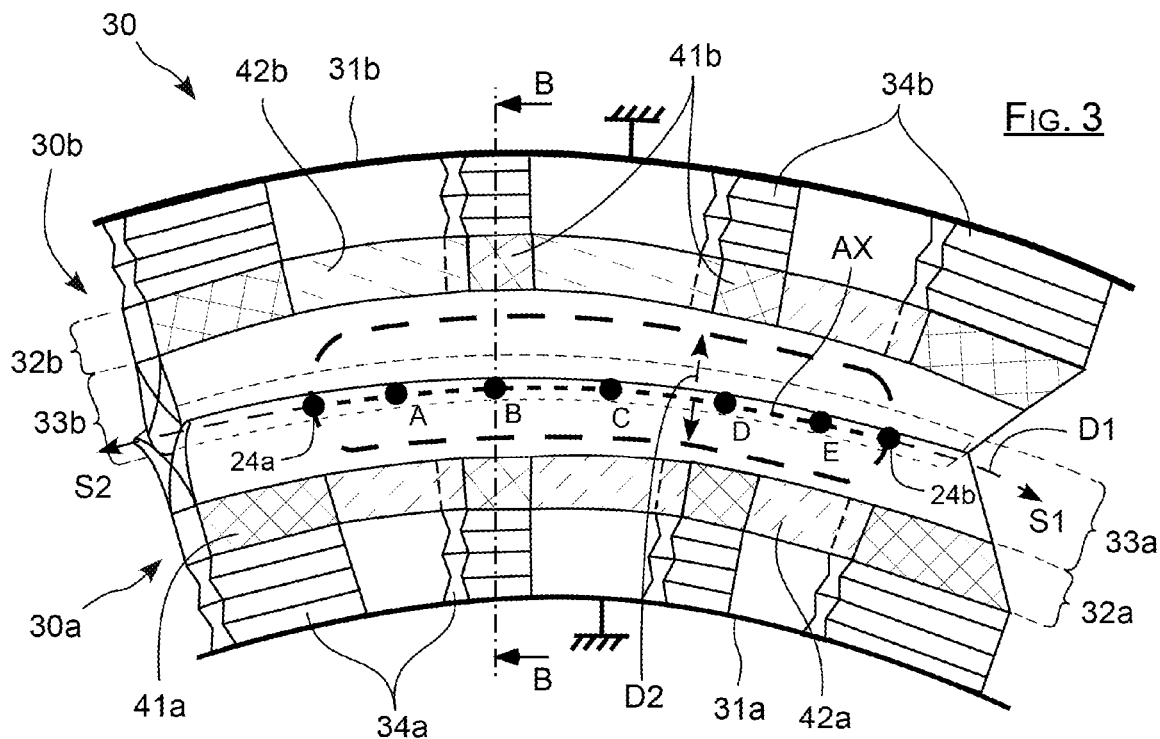
FIG. 3 is a perspective view of a seal fitted on a routing slit according to the invention.

This seal 30, illustrated independently of the drive shaft 22 and fitted in the slit 24 in FIG. 3, comprises a seal lower part 30a and a seal upper part 30b with a similar structure and bearing on lower and upper mountings 31a and 31b respectively fixed to the fuselage wall 5a. These seal lower and upper parts 30a and 30b are arranged on each side of the slit 24 along the width direction of the slit, reference D2 on the figures. The width direction D2 of the slit is locally approximately orthogonal to the length direction D1 of the slit at all points along the slit. More precisely, the seal lower part 30a has a convex shape as viewed from the slit, and in a complementary manner the seal upper part has a concave shape as viewed from the slit, with the lower and upper mountings 31a et 31b that intersect the fuselage wall 5a each forming a line corresponding to an offset of direction D1 along D2.

The seal lower part 30a comprises a lower stiffener 32a forming its central body, a lower lip 33a that prolongs the lower stiffener 32a towards the slit 24 along D2, and a series of lower stands 34a at intervals that project from the lower stiffener 32a along direction D2 away from the slit 24 to bear on the upper mounting 31a. Similarly, the upper part of the seal 30b comprises an upper stiffener 32b prolonged towards the slit along direction D2 by an upper lip 33b, and towards the upper mounting 31b also along D2 through stands 34b at intervals from each other and bearing on the upper mounting.

The lower and upper seal parts 30a and 30b are held in place by mountings 31a and 31b in contact with each other at the lips along their length direction in the absence of the shaft 22 forming an opposition force that deforms the seal 30.

More specifically, the lower and upper stands 34a and 34b, arranged facing each other along the width direction D2, are elastic elements formed from a succession of portions in accordion formation 35, called bellows, working independently of each other to press the two seal parts in contact with each other.

The description of the seal 30 given above was made when the seal is fitted in the slit in the absence of the shaft 22, but it should be understood that during operation, the two seal parts 30a and 30b always squeeze the shaft, forming open spaces on each side of the shaft. The seal parts 30a and 30b are designed to prevent the appearance of an opening towards the outside of the seal 30 along direction D1, particularly in the most critical case when the shaft is at the forward and aft ends 24a and 24b of the slit, the seal parts 30a and 30b extending beyond the slit 24 along this direction D1. In the example in the figures, each of the lower and upper seal parts 30a and 30b comprises a series of four stands 34a and 34b, including two formed on each side of the slit that have a significantly larger volume that those formed facing this slit for this purpose.

The basic concept of the invention is to provide the most flexible possible seal 30 while having low shear stiffness so as to limit opening spaces induced by its deformation due to the passage of the shaft 22.

In this respect, the major feature of this invention lies in the particular and complementary morphology of these lower and upper lips 33a and 33b designed to form contact tracks between which the drive shaft 22 is squeezed at its passage point.

The lips 33a and 33b have a "rabbit ear" type structure comprising a rigid base 36a et 36b respectively from which flexible and compressible outgrowths 37a and 37b project. The outgrowths 37a from the lower lip 33a are independent of each other and extend on each side of the median line of the slit centred on direction D1. In the case of the upper lip 33b, the outgrowths 37b are connected to each other at their end remote from the base 36b, through a flexible and compressible balloon 38 that will be positioned between the two outgrowths 37a of the lower lip, providing an efficient seal of the slit 24 when the seal 30 is in the rest position as illustrated on FIG. 4.

Figure 4:
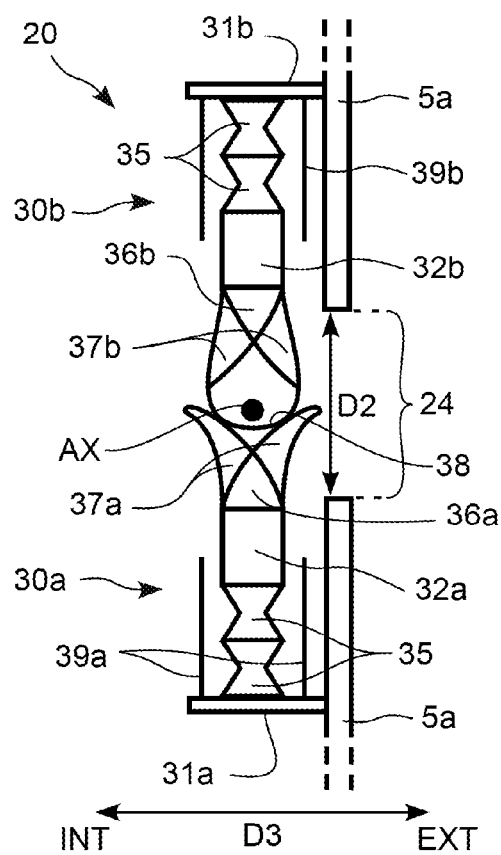
FIG. 4 is a sectional view taken along line B-B in FIG. 3 when the seal is at rest according to the invention.
Figure 5:
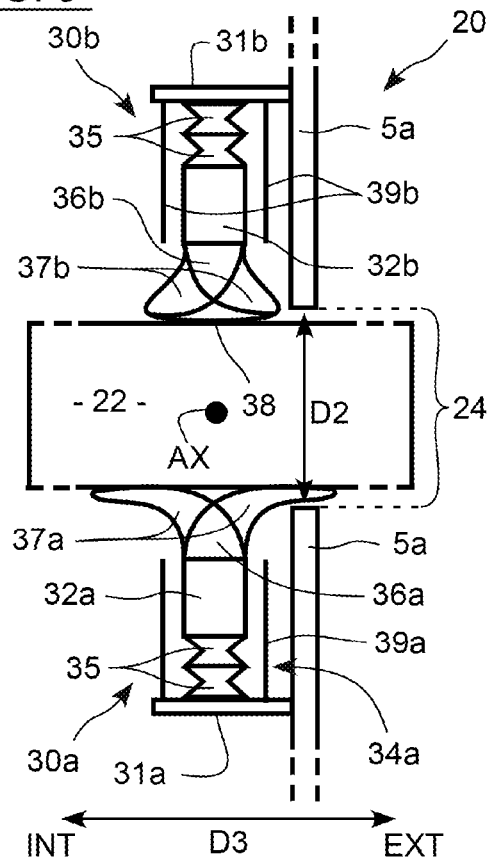
FIG. 5 is a sectional view taken along line B-B in FIG. 3 when the seal is stressed by the drive shaft according to the invention.

Under the action of the shaft 22 as illustrated in FIG. 5 in the same view as that in FIG. 4, the lower and upper outgrowths 37a and 37b and the balloon 38 are compressed to affect the rigid bases 36a and 36b that then compress the lower and upper stands 34a and 34b along direction D2 to create a self-blocking effect. It should then be noted that the accordion layout 35 of the portions functioning independently of each other overcomes the bridge effect induced by the curvature of the seal parts 30a and 30b, that could otherwise prevent compression of the stand and thus block movement of the shaft 22 in the slit 24.

In general, the flexible nature, particularly in shear, of the outgrowths 37a and 37b and of the balloon 38, limit their deformation to a local zone around the shaft, in other words these elements do not move downwards as a whole. The lugs and the balloon return to their so-called rest position close to the drive shaft 22, such that the lips 33a and 33b are capable of surrounding the shaft 22 to limit the appearance of parasite opening spaces. This aspect, combined with nesting of the lower and upper lips assure a self-stabilising effect in a reference lateral direction D3 that is normal to the fuselage wall 5a, in other words good resistance to loads along this lateral direction. Due to local deformation of seal parts 30a and 30b, for a seal sector deformed by the shaft 22, there are two seal sectors at rest on each side of the deformed sector and in which the lips 33a et 33b are engaged. This engagement at the seal sectors at rest prevents misalignment of the lips along direction D3 at the deformed sector, called the self-stabilising effect.

It should also be noted that the outgrowths 37a and 37b become flattened at the shaft passage 22, the load of the shaft on the seal parts loses its shear component and becomes pure bending along the direction of the width D2, thus amplifying the winding effect of the lips around this shaft.

It should be emphasised that due to its morphology, the seal 30 according to the invention is deformed from the lips to the stands, in other words the loads applied by the shaft are resisted over its entire extent along the width direction D2. This aspect optimises functioning of the seal according to the invention because it prevents excessive deformation of a specific part of the seal which would otherwise then be subject to premature wear.

In order to increase the stability of seal parts 30a and 30b along the lateral direction D3, normal to the fuselage wall 5a, the lower and upper mountings 31a and 31b are prolonged by lower and upper lateral walls 39a and 39b that extend parallel to the fuselage wall 5a on each side of the seal parts 30a and 30b, as can be seen on FIGS. 4 and 5. These lower and upper lateral walls 39a and 39b extend close to seal parts 30a and 30b respectively to form stop surfaces preventing the lower and upper stands 34a and 34b provided with their accordion portions 35 from spreading laterally by buckling along direction D3 at the time of the passage of the drive shaft. This spreading effect is particularly significant when the dimension of the seal parts along the width direction D2 of the slit is large. In this respect, in particular the invention discloses that the each of the seal parts for a 10 cm diameter drive shaft measures 25 to 30 cm along D2.

The lower and upper side walls 39a and 39b are metal plates added onto the lower and upper mountings 31a and 31b, but it is understood that the invention could include side walls formed in a single piece with the mountings. It should also be noted that providing side walls on only one of the two mountings, and particularly on the lower baseplate 31a, is not outside the scope of the invention.

Finally, since these sidewalls 39a and 39b must not hinder deformation of the seal, their extent measured from the mounting that supports them along the width direction D2 is limited to remain below the value for which they would touch the outgrowths 37a or 37b of the lip associated with them when loaded by the shaft.

Another particular feature of the invention lies in the different behaviour of the seal 30 depending on its position relative to the drive shaft 22.

To achieve this, the lower stiffener 32a is formed from an alternation of lower rigid cells 41a and lower flexible cells 42a to limit the stiffness in shear, and in the same way the upper stiffener 32b is formed from an alternation of upper rigid cells 41a and upper flexible cells 42b. Each of the lower rigid cells 41a is located along the prolongation along D2 of a lower stand 34a. According to the same arrangement, each of the upper rigid cells 41a is located along the prolongation along D2 of an upper stand 34a.

In other words, only the rigid cells 41a and 41b are supported by a stand, in which each flexible cell is arranged between two rigid cells.

A distinction is then made between the relative positions A, C or E of the shaft 22 at which the seal 30 will have a first deformation surface, and positions B and D for which the seal 30 has a second deformation surface distinct from the first.

Figure 6:
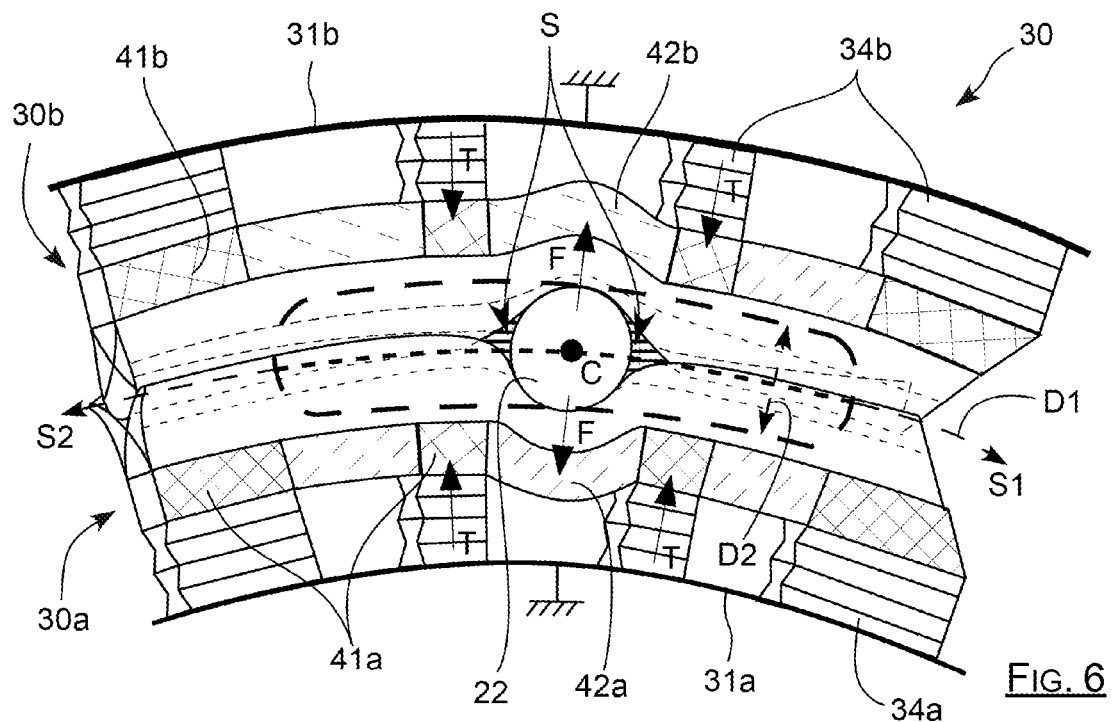
FIG. 6 shows a first deformation surface of the seal according to the invention.

For the first deformation surface represented on FIG. 6, in this case when the shaft 22 is located at position C and applies a force F, the flexible cells 42a and 42b aligned with the shaft 22 along direction D2 bend with the lips 33a and 33b due to their flexible attribute, while the stands 34a and 34b projecting beyond the adjacent rigid cells 41a and 41b force the lips around the shaft 22 due to an elastic reaction T. The opening spaces identified as S are then very small because the seal is deformed at specific locations, maximising the surround around the drive shaft 22. Strategically, portions A, C and E correspond to the predefined locking positions of the drive shaft 22 for which the best surround is required, where A is the fully retracted position of the flap, E is the fully extended position of the flap and C is the "intermediate" takeoff position.

Figure 7:
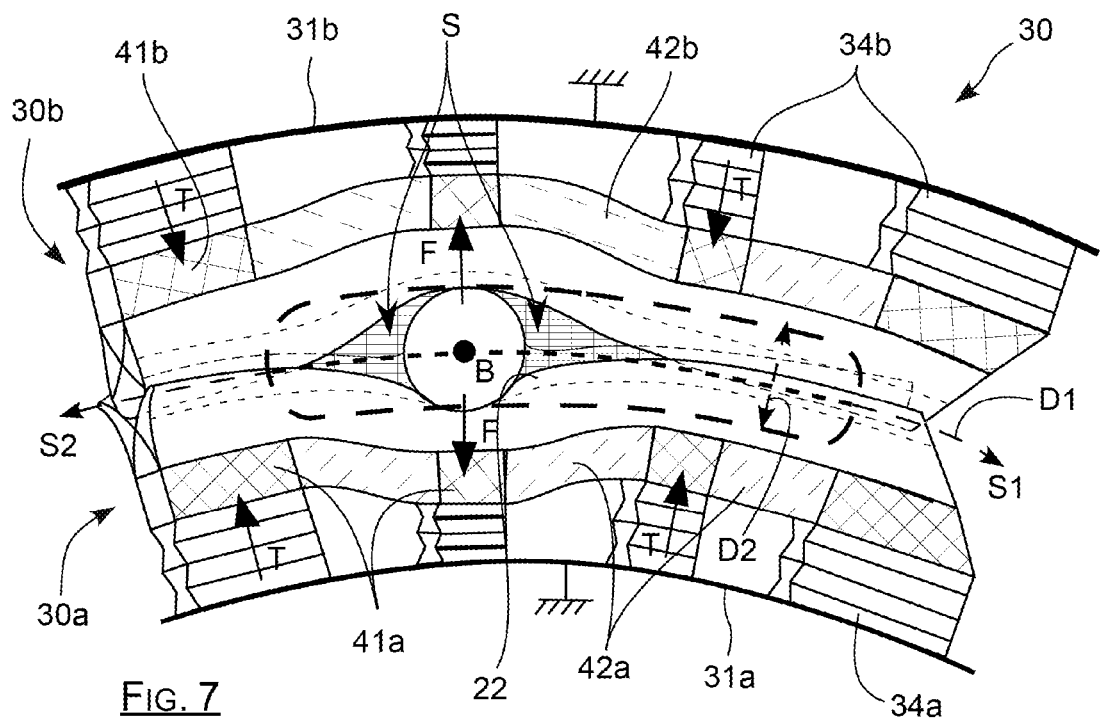
FIG. 7 shows a second deformation surface of the seal according to the invention.

On the other hand, with regard to the second deformation surface represented on FIG. 7 for position B, the stands 34a and 34b associated with the rigid cells 41a and 41b loaded by force F are compressed, and at the same time deform the adjacent flexible cells 42a and 42b, that induces a more extensive deformation of the seal and therefore larger opening spaces S than in the first surface. Considering that positions B and D of the shaft 22 form shaft transition positions between positions A, C and E, in other words at which the shaft is deemed to be located only very briefly on the way towards a locking position, disturbances in these zones are negligible.

With this arrangement, it will be understood that the alternation of rigid and flexible cells according to the invention is designed to strategically minimise opening spaces for effective usage positions of the flap 16. This specific morphology of the lower and upper stiffeners 32a and 32b can thus exacerbate the winding effect conferred by the "rabbit ears" shape of the lips, for the locking positions.

In the example in the figures, the lip comprising outgrowths connected by the balloon 38 is strategically supported by the upper seal part 30a so as to overcome local warping during its deformation due to its concave curvature, but it should be noted that the opposite arrangement can be adopted without going outside the framework of the invention.

Furthermore, the invention is not limited to a routing slit 24 extending along a circular trajectory, controlling the orientation of the lower and upper seal parts 30a and 30b, so that other flap movement trajectories 16 such as a straight slit become possible.

It should be noted that the invention could include a different architecture of the stands 34a and 34b, particularly in the absence of a bridge effect in the case in which the seal upper and lower parts 30a and 30b extend in a straight line being fitted on a straight slit.

In the example in the figures, the performance of the seal 30 is particularly good for three predefined positions of the flap 16, i.e. the fully retracted position of the flap, the fully extended position of the flap, and the so-called intermediate takeoff position. In this respect, it should be noted that the number of flexible and rigid cells of the lower and upper stiffeners could be increased, to further delimit positions useful for the need.

Specifically, the seal according to the invention is not limited to actuation of a flap, and can be applied in the general field of aviation, by disclosing sealing of a hollowed out slit in an aircraft surface such as a fuselage wall or a wing surface, delimiting its interior INT from its exterior EXT, a drive shaft of a variable geometry lift surface located on the exterior passing through this slit and being moveable along the length of this slit.

What is claimed is:

1. An assembly for aircraft comprising:
    a wall delimiting the interior from the exterior of the aircraft, such as part of the fuselage or wing, this well being provided with a through formed routing slit extending along a length direction of the slit from a forward end the slit to an aft end of the slit;
    a drive shaft that supports a bearing surface, this shaft passing through the slit and being free to move along the length direction of the slit between the forward and aft ends of the slit;
    a lower mounting and an upper mounting fixed to the wall and arranged on each side of the slit along a width direction of the slit that is normal to the length direction of the slit;
    a seal to seal the slit, comprising a seal lower part and a seal upper part arranged facing each other on each side of the slit along the width direction and supported by the lower mounting and the upper mounting respectively, the seal lower part and the seal upper part comprising a flexible lower lip and upper lip respectively compressible in the width direction, these lower and upper lips forming contact tracks between which the drive shaft is squeezed and moves deforming the seals when the bearing surface is moved;
    wherein the seal lower part comprises a lower stiffener supporting the lower lip, the seal upper part comprises an upper stiffener supporting the upper lip, with either the lower lip or the upper lip comprising two independent outgrowths, and the other among the lower Up and the upper lip comprising two outgrowths connected to each other by a flexible and compressible balloon that will be housed between the two independent outgrowths when the lower Up and the upper Up engage directly with each other.

2. The assembly according to claim 1, wherein each of the lower and upper lips comprises a rigid base starting from which the outgrowths project.

3. The assembly according to claim 1, wherein:
    the lower stiffener is supported by lower stands at a spacing from each other along the length direction of the slit and bearing on the lower mounting;
    the upper stiffener is supported by upper stands at a spacing from each other along the length direction the slit and bearing on the upper mounting;

these lower and upper stands being designed to press the lower and upper lips into contact with each other, while remaining compressible along the width direction of the slit.

4. The assembly according to claim 3, wherein the lower and upper stands are formed from a sequence of accordion shaped elastic portions along the width direction of the slit.

5. The assembly according to claim 1, wherein:
the lower stiffener is formed from an alternation of lower rigid cells and lower flexible cells;
the upper stiffener is formed from an alternation of upper rigid cells and upper flexible cells.

6. The assembly according to claim 5, wherein:
the lower stiffener is supported by lower stands at a spacing from each other along the length direction of the slit and bearing on the lower mounting;
the upper stiffener is supported by upper stands at a spacing from each other along the length direction of the slit and bearing on the upper mounting;
these lower and upper stands being designed to press the lower and upper lips into contact with each other, while remaining compressible along the width direction of the slit;
each of the lower rigid cells is arranged along the prolongation of a lower stand along the width direction of the slit;
each of the upper rigid cells is arranged along the prolongation of an upper stand along the width direction of the slit.

7. The assembly according to claim 1, wherein the slit is curved in the length direction of the slit is circular, in which the seal lower part has a convex shape as viewed from a direction perpendicular to the width direction and the length direction of the slit, and in a complementary manner the seal upper part has a concave shape as viewed from the direction perpendicular to the width direction and the length direction of the slit, the lower and upper mountings extending perpendicular to the fuselage wall and each intersecting the fuselage wall so that the lower and upper mountings each forms a line corresponding to an offset from the length direction of the slit, along the width direction of the slit.

8. The assembly according to claim 7, wherein the independent outgrowths are formed in by the upper lip.

9. The assembly according to claim 1, wherein the lower mounting is prolonged by lower side walls that at least partly surround the seal lower part, and/or the upper mounting is prolonged by upper side walls that at least partly surround the seal upper part, these lower and upper side walls forming stop surfaces for the seal lower and upper parts extending along the width direction of the slit.

10. The assembly according to claim 1, wherein the supporting surface is a moveable trailing edge flap.

* * * * *

UNITED STATES PATENT AND TRADEMARK OFFICE
CERTIFICATE OF CORRECTION

PATENT NO. : 10,981,644 B2
APPLICATION NO. : 16/272171
DATED : April 20, 2021
INVENTOR(S) : Albert-Paul Gonze et al.

It is certified that error appears in the above-identified patent and that said Letters Patent is hereby corrected as shown below:

In the Specification

Column 8, Line 52, "among the lower UP and" should read -- among the lower lip and --

Column 8, Line 56, "the lower Up and" should read -- the lower lip and --

Column 8, Line 56, "the upper Up engage" should read -- the upper lip engage --

Column 10, Line 5, "slit is circular, in which" should read -- slit, in which --

Signed and Sealed this
Twenty-eighth Day of June, 2022

*Katherine Kelly Vidal*

Katherine Kelly Vidal
*Director of the United States Patent and Trademark Office*